United States Patent

[11] 3,571,708

| [72] | Inventor | Bobby L. Hurt |
| | | Rte. 3, Concord, Tenn. 37720 |
| [21] | Appl. No. | 797,853 |
| [22] | Filed | Feb. 10, 1969 |
| [45] | Patented | Mar. 23, 1971 |

[54] VOLTAGE INDICATOR AND WRITING INSTRUMENT
6 Claims, 3 Drawing Figs.

[52] U.S. Cl. .................................................. 324/133, 324/72.5
[51] Int. Cl. ....................................................... G01r 19/16
[50] Field of Search........................................... 324/51, 53, 72.5, 149, 133, 122

[56] References Cited
UNITED STATES PATENTS

| 1,650,779 | 11/1927 | Williams........................ | 324/51X |
| 2,204,136 | 6/1940 | King et al..................... | 324/53X |
| 2,261,320 | 11/1941 | Williams........................ | 324/53X |
| 2,474,073 | 6/1949 | Sundt............................ | 324/133X |
| 2,477,642 | 8/1949 | Novello......................... | 324/51X |
| 2,536,577 | 1/1951 | Simmons et al.............. | 324/51 |
| 2,542,478 | 2/1951 | Clark............................. | 324/72.5UX |
| 2,639,318 | 5/1953 | Des Roches.................. | 324/51 |
| 2,204,136 | 6/1940 | King et al..................... | 324/53X |

*Primary Examiner*—Gerard R. Strecker
*Attorney*—Paul E. Hodges

ABSTRACT: A voltage indicating circuit integrated into a retractable-tip writing instrument.

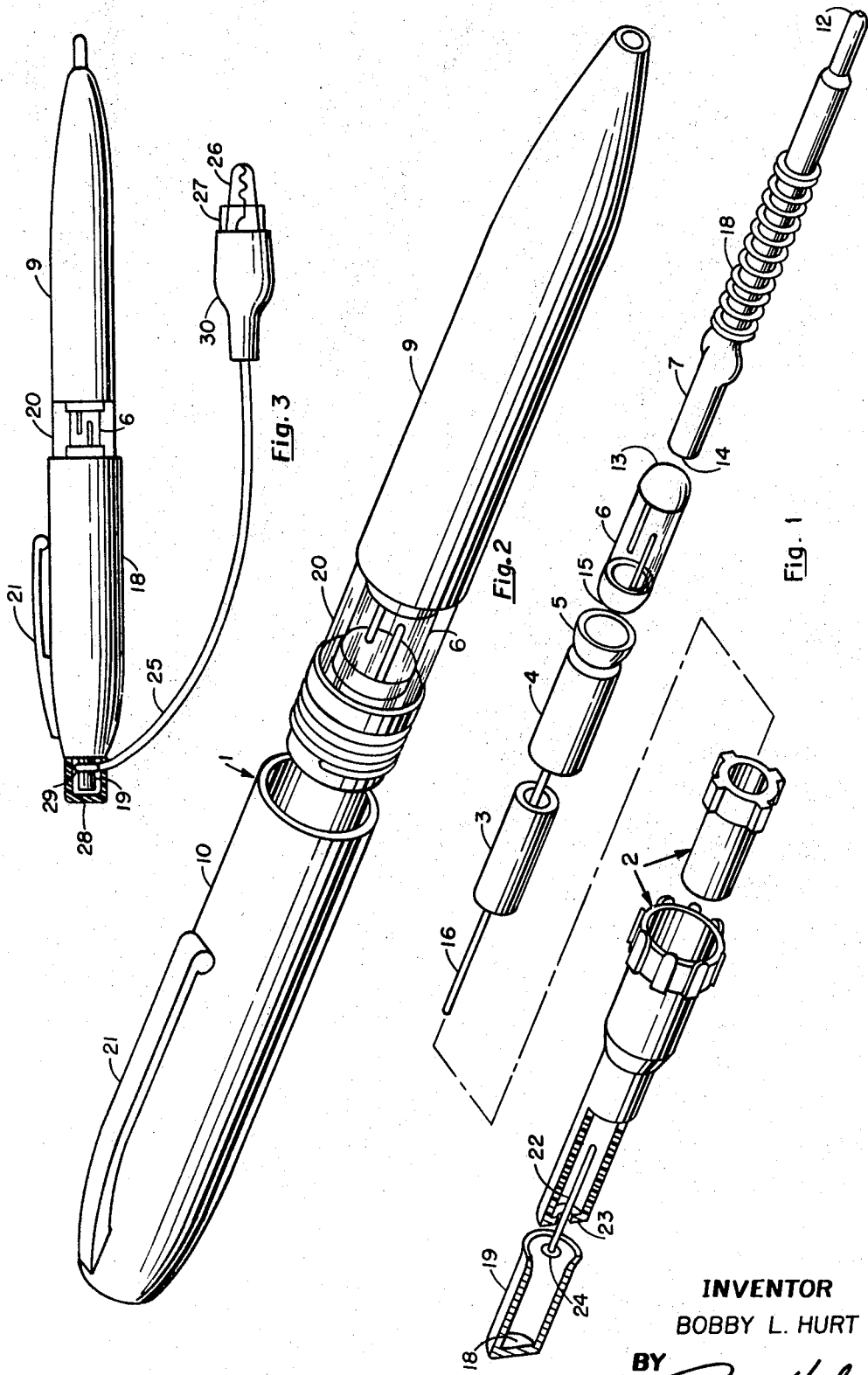

VOLTAGE INDICATOR AND WRITING INSTRUMENT

BACKGROUND OF INVENTION

This invention relates generally to writing instruments of the retractable-tip type, to voltage indicators, and more particularly to a retractable-tip ball point pen adapted to function as a voltage indicator.

SUMMARY OF INVENTION

In the present invention, the inventors provide a writing instrument of the retractable writing tip type where the instrument serves the additional function of indicating voltages. The invention provides all the normal features of a retractable-tip writing instrument. Additionally, the metallic ink cartridge functions as a probe element in an electrical voltage-indicating circuit comprising the metal refill ink cartridge, a neon bulb, a resistor in sliding contact with said neon bulb, and appropriate electrical connection between said resistor and the metal pushbutton normally found on such writing instruments and utilized for retracting the writing tip of the instrument, and a suitable ground. It is contemplated that the person of a user of the present invention will serve as the necessary electrical ground.

In use, the writing tip of the instrument is maintained in its retracted position until the point of the instrument is positioned adjacent to the electrical component whose voltage is to be checked. Thereupon the user depresses the pushbutton on the cap end of the instrument with his thumb to cause the metallic ink cartridge to contact the electrical component under test. Assuming a voltage existent at the electrical component under test, current will flow through the metallic writing tip to one electrode of the neon bulb, through the neon bulb to its second electrode, thence, by means of a sliding contact, to one lead of a resistor, thence through the resistor; thence through the other lead of the resistor to the metal cap contacted by the user's thumb, thence through the body of the user to ground, thereby completing an electrical circuit. Upon completion of the circuit, the neon bulb will ignite indicating the presence of a voltage at the electrical component under test. The user, thereupon, may withdraw the instrument and have at his immediate disposition a writing instrument useful in recording the voltage noted. In this manner the voltage value is recorded with minimum delay from the time of its observation thereby minimizing the possibility of error in recording the observed voltage. Because the writing tip of the writing instrument is retractable, the instrument may be carried in a user's pocket without fear of producing ink stains and marks upon his clothing. Additionally the convenient configuration of the writing instrument renders the instrument highly suitable for storage in the user's shirt pocket or the like, ready for instant use. This slender elongated geometry of the present invention facilitates insertion of the instrument between and among crowded electrical components so as to exactly position the tip immediately adjacent the circuit component under study before extending the writing tip. The electrically-insulative housing of the present invention and the retractable writing tip feature preclude deleterious short circuiting due to inadvertent contacts by the instrument during probing operations.

By providing appropriate sliding electrical contacts between selected ones of the circuit components the present instrument embodies all of the desirable attributes of a retractable-tip writing instrument while simultaneously functioning as a voltage indicator. The writing instrument barrel and cap are constructed from nonconductive material, such as a plastic, thereby insulating all portions of the instrument except the pushbutton employed to retract the writing tip. Of course, when activated by the pushbutton, the writing tip of the instrument becomes exposed as desired. C

DESCRIPTION OF FIGURES

FIG. 1 is an exploded view of those components of the disclosed invention which are intended to be housed within the insulative tubular housing;

FIG. 2 is a view of the tubular housing of the invention depicting the lamp 6 in position intermediate the two end sections of the housing; and FIG. 3 is a view of an assembled embodiment of the invention and showing a ground wire, the ground wire connection being depicted in section.

DESCRIPTION OF INVENTION

Referring now to FIG. 1, the present invention includes a tubular housing shown generally at 1 and comprising a barrel 9 and a cap 10 adapted to be joined by a transparent transition member 20 rigidly joined to barrel 9 and threaded to receive cap 10. As desired, clip means 21 may be provided on cap 10 for use in retaining the instrument within the pocket of a user. Housing 1, including the transition member 20, may be fabricated of any nonconductive material, such as the plastics currently available from numerous sources.

Within the housing there are disposed those elements of the subject invention which function as both the retractable writing mechanism of the instrument and the circuitry for voltage indication purposes. These components comprise an electrically-conductive ink cartridge 7 having a writing tip 12 and being of tubular configuration whose end 14 is open. A spring 8 encircles cartridge 7 to bias the writing mechanism retracted. Spring 8 also performs the critical function of maintaining the circuit components in good electrical contact. A neon bulb 6 preferable of the type having rounded end electrodes 13 and 15 is coaxially aligned within the housing with ink cartridge 7; the end 13 of bulb 6 fits into the open end 14 of cartridge 7 thereby electrically connecting cartridge 7 and bulb 6. A cylindrical resistor 4 having a cup-shaped electrode 5 adapted to receive end 15 of bulb 6 is disposed in coaxial alignment with bulb 6 and cartridge 7. Electrode 5 is thus electrically connected to electrode 15 of bulb 6. It will be appreciated at this point that bulb 6 is in sliding electrical contact at either of its ends with its adjacent circuit components. It will also be observed that ink cartridge 17 is disposed wholly within barrel 9 and bulb 6 is disposed within the transparent transition member 20, hence readily viewable by a user of the instrument.

The second electrical lead 16 of resistor 4 extends from said resistor through a tubular spacer 3 and terminates within the hollow conventional retraction mechanism of a ball point pen. Spacer 3 is designed to fill the gap between resistor 4 and the usual retraction mechanism 2 found in ball point pens. In this position, the spacer transmits to the resistor (hence the bulb and ink cartridge) the longitudinal forces necessary for extension and retraction operations.

A rigid elongated electrical conductor is provided in the end 23 of retraction mechanism 2. This conductor preferably possesses an enlarged head portion 24 exposed externally of the end 23 of said mechanism 2. A retraction pushbutton, fabricated of electrically conductive material is fitted over the end 23 of retraction mechanism 2. In this position the interior end 18 of pushbutton 19 contacts the enlarged head 24 of conductor 22 in sliding electrical contact. Thus, pushbutton 19 may be rotated, as frequently occurs when depressed by the thumb of a user, without twisting of conductor 22. It will be noted that conductor 22, as disposed within retraction mechanism 2, slidingly contacts lead 16 of resistor 4. This mode of electrical connection between conductor 22 and lead 16 provides sliding contact therebetween in two directions; namely, the conductors may slide longitudinally with respect to each other or may slide around each other in the event either one is rotated. Rotational freedom between these two electrical components is required in the usual retractable tip writing instrument because the retraction mechanism thereof rotates several degrees upon actuation thereof. Longitudinal freedom of movement between these two conductors is desirable to lend flexibility as regards assembly. This connection design does not require a solder joint.

It will be noted at this point that the position of ink cartridge 7 within barrel 9 is fixed by the geometrical fit between these two components. This relationship fixes one end dimension of the components within the housing. The other end dimension of the components is fixed by the geometrical fit between the retraction mechanism 2 and cap 10. All other components disposed between these two end dimensions must be so selected and fitted that the entire space between the end dimensions is completely filled and all components are in good electrical contact with each other. It is recalled that spring 8 maintains these components biased in contact.

The present invention is further depicted in FIGS. 2 and 3. These FIGS. show an alternative ground comprising a lead 25 connected by a metal ring 29 to pushbutton 19, such connection being covered by a resilient electrically insulative cover 28. The other end of lead 25 is provided with an alligator clip 26 for attaching that end of the lead to a ground. Preferably, the alligator clip is substantially encapulated by insulative material 27 and 30. A probe of any conventional type could readily be substituted for the alligator clip.

It will be appreciated that repair of the present invention is extremely simple. For example, if one unscrews cap 9, thereby separating it from barrel 10, all the components of the device may be readily removed and replaced as necessary. This feature is useful for replacing the ink cartridge thereby permitting one to extend the life of the device past the usual short life of normal ink cartridges. Only because of the unique mode of electrical connection between the circuit components is such unscrewing motion permissible; screwing motions would break fixed connections.

Moreover, the ability to retain the probe (writing tip) retracted within the insulative barrel permits one to move the device among several conductors until positioned contiguous to the conductor sought to be examined. When so positioned, the probe may be extended remotely, the test completed, and the probe retracted prior to withdrawal of the device. Consequently, damaging short circuits, etc. are avoided.

In the usual retractable tip writing instrument the retraction mechanism is fabricated of a plastic material, hence is electrically nonconductive. If one desired, this mechanism could be of metallic construction. The electrical connection between this mechanism and the resistor could then comprise mating sliding buttons, one on the resistor and a like one on the retraction mechanism. Other similar embodiments of the retraction mechanism and resistor could be devised readily by one skilled in the art and having the benefit of this disclosure.

I claim:

1. In a novel voltage indicator the combination comprising:

electrically insulative elongated tubular housing means comprising first and second end sections releaseably joined in coaxial alignment and a viewing window disposed in at least one of said end sections;

an electrically-conductive probe including a writing tip disposed within said first end section and reciprocatable between a position where said probe is fully housed within said first end section and nonavailable for establishing electrical contact with objects outside said first end section and a position where at least the writing tip of said probe is exposed exteriorly of said first end section;

reciprocation means disposed within said second and section and adapted to selectively move said writing tip between its positions inside and outside said first end section;

at least one electrically-conductive member associated with said reciprocation means and extending exteriorly of said housing and adapted to be electrically grounded; and voltage-indicating circuit means including at least a resistor and a lamp electrically disposed between said probe and said electrically-conductive member associated with said reciprocation means with said lamp being viewable through said window in said housing, said lamp and said resistor including electrical contact means on their respective opposite ends and being disposed in end-to-end relationship with each other with releasable electrical contact therebetween, said lamp and resistor being disposed between said probe and said electrically-conductive member associated with said reciprocation means, thereby establishing electrical continuity between said probe and said electrically-conductive member.

2. The voltage indicator of claim 1 wherein said probe comprises a replaceable tubular metallic ink cartridge.

3. The invention of claim 2 wherein said lamp contacts the nonwriting end of said ink cartridge in sliding electrical connection therewith.

4. The voltage indicator of claim 1 wherein said probe, lamp, resistor and reciprocation means are coaxially aligned within said housing.

5. The voltage indicator of claim 1 wherein the electrical connection between said electrically-conductive member associated with said reciprocation means and its neighboring circuit components possesses rotational and longitudinal freedoms of movement.

6. The voltage indicator of claim 1 wherein said resistor is disposed between said lamp and said electrically-conductive member associated with said reciprocation means, said resistor including an elongated electrical contact extending from one end thereof in the direction of said electrically-conductive member, and said electrically-conductive member comprising an elongated electrical contact disposed in sliding contact with said elongated electrical contact of said resistor.